United States Patent
Masuda

(10) Patent No.: US 9,064,443 B2
(45) Date of Patent: Jun. 23, 2015

(54) PROJECTION APPARATUS, PROJECTION METHOD, AND STORAGE MEDIUM STORING PROGRAM, FOR REDUCING ENERGY CONSUMPTION BY SHORTENING COLOR MIXING PERIOD

(71) Applicant: CASIO COMPUTER CO., LTD., Shibuya-ku, Tokyo (JP)

(72) Inventor: Hiroki Masuda, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 61 days.

(21) Appl. No.: 14/017,144

(22) Filed: Sep. 3, 2013

(65) Prior Publication Data

US 2014/0063082 A1 Mar. 6, 2014

(30) Foreign Application Priority Data

Sep. 4, 2012 (JP) ................................. 2012-194354

(51) Int. Cl.
*G09G 5/02* (2006.01)
*G03B 21/14* (2006.01)
(Continued)

(52) U.S. Cl.
CPC .............. *G09G 5/026* (2013.01); *G03B 21/142* (2013.01); *G03B 21/2013* (2013.01); *G03B 21/2053* (2013.01); *G03B 33/00* (2013.01); *H04N 9/3117* (2013.01); *G09G 3/3413* (2013.01); *G09G 3/346* (2013.01); *G09G 2310/0235* (2013.01); *G09G 2310/0237* (2013.01); *G09G 2320/103* (2013.01); *G09G 2330/021* (2013.01); *G09G 2360/16* (2013.01)

(58) Field of Classification Search
CPC .............. G09G 2320/0626; G09G 2320/0633; G09G 2320/064
See application file for complete search history.

(56) References Cited

U.S. PATENT DOCUMENTS 8,348,435 B2 1/2013 Ogino et al.
2007/0052932 A1 3/2007 Blonde et al.
(Continued)

FOREIGN PATENT DOCUMENTS

CN 1885154 A 12/2006
CN 1930873 A 3/2007
(Continued)

OTHER PUBLICATIONS

Korean Office Action dated Jan. 12, 2015, issued in counterpart Korean Application No. 10-2013-0105378.
(Continued)

*Primary Examiner* — Kevin M Nguyen
(74) *Attorney, Agent, or Firm* — Holtz, Holtz, Goodman & Chick PC

(57) ABSTRACT

A projection apparatus includes a light source with light emitting devices of a plurality of colors, a drive unit configured to drive the light emitting devices of the plurality of colors so as to orderly emit single-color light and mixed-color light, an input unit configured to input an image signal, a projection unit configured to form and emit an optical image corresponding to an image signal input by the input unit, using the single-color light and the mixed-color light, and a control unit configured to emit the mixed-color light in a part of a light emission period of the mixed-color light and switch off the light emitting devices during a rest of the part of the light emission period, based on the image signal input by the input unit.

9 Claims, 7 Drawing Sheets

(A) BEFORE SHORTENING SETTING (B) AFTER SHORTENING SETTING

(51) Int. Cl.
*G03B 21/20* (2006.01)
*G03B 33/00* (2006.01)
*H04N 9/31* (2006.01)
*G09G 3/34* (2006.01)

(56) References Cited

U.S. PATENT DOCUMENTS

| | | | |
|---|---|---|---|
| 2007/0064422 A1* | 3/2007 | Murai | 362/231 |
| 2007/0070296 A1 | 3/2007 | Iwanaga | |
| 2007/0263181 A1 | 11/2007 | Hying et al. | |
| 2008/0129714 A1* | 6/2008 | Akiyama et al. | 345/204 |
| 2009/0135315 A1* | 5/2009 | Endo et al. | 348/771 |
| 2009/0153590 A1* | 6/2009 | Hewlett et al. | 345/690 |
| 2009/0174824 A1* | 7/2009 | Shirai et al. | 348/760 |
| 2009/0189845 A1 | 7/2009 | Toyooka | |
| 2010/0073639 A1 | 3/2010 | Shibasaki | |
| 2010/0328626 A1 | 12/2010 | Miyazaki | |
| 2011/0298832 A1* | 12/2011 | Lai et al. | 345/690 |
| 2012/0320109 A1 | 12/2012 | Shibasaki | |

FOREIGN PATENT DOCUMENTS

| | | |
|---|---|---|
| CN | 101253776 A | 8/2008 |
| CN | 101995750 A | 3/2011 |
| JP | 2008116781 A | 5/2008 |
| JP | 2011-095388 A | 5/2011 |
| KR | 1020080031483 A | 4/2008 |
| KR | 1020090082861 A | 7/2009 |
| KR | 1020100035118 A | 4/2010 |

OTHER PUBLICATIONS

Chinese Office Action (and English translation thereof) dated Feb. 28, 2015, issued in counterpart Chinese Application No. 201310397476.9.

\* cited by examiner

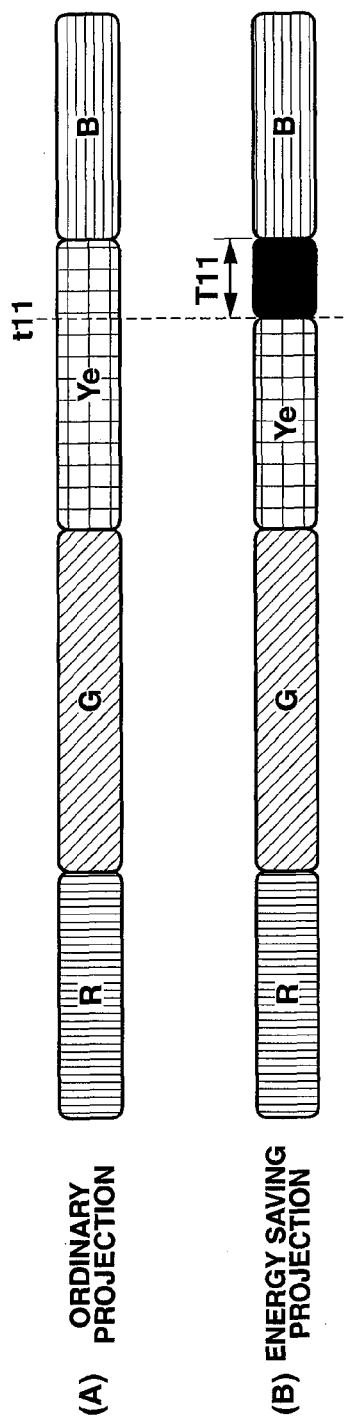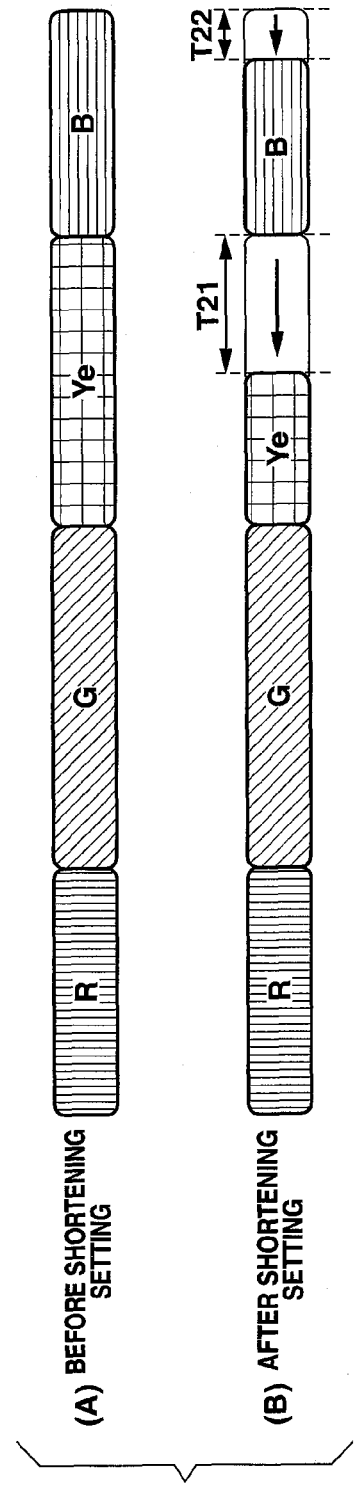

| W RATE / Ye MAXIMUM GRADATION | 0 % | 0 TO LESS THAN 25 % | 25 TO LESS THAN 50 % | 50 % OR MORE |
|---|---|---|---|---|
| 255 | WITHOUT ENERGY SAVING | WITHOUT ENERGY SAVING | WITHOUT ENERGY SAVING | WITHOUT ENERGY SAVING |
| 254 OR LESS 191 OR MORE | 25 % | 20 % | 15 % | WITHOUT ENERGY SAVING |
| 190 OR LESS 159 OR MORE | 40 % | 30 % | 20 % | WITHOUT ENERGY SAVING |
| 158 OR LESS 129 OR MORE | 70 % | 50 % | 30 % | WITHOUT ENERGY SAVING |
| 128 OR LESS | 100 % | 50 % | 25 % | WITHOUT ENERGY SAVING |

PROJECTION APPARATUS, PROJECTION METHOD, AND STORAGE MEDIUM STORING PROGRAM, FOR REDUCING ENERGY CONSUMPTION BY SHORTENING COLOR MIXING PERIOD

CROSS-REFERENCE TO RELATED APPLICATIONS

This application is based upon and claims the benefit of priority from prior Japanese Patent Application No. 2012-194354, filed Sep. 4, 2012, the entire contents of which are incorporated herein by reference.

BACKGROUND OF THE INVENTION

1. Field of the Invention

The present invention relates to a projection apparatus and a method and a program thereof, for reducing energy consumption by shortening a color mixing period, which are most suitably used for a projector using a semiconductor light source.

2. Description of the Related Art

For example, Jpn. Pat. Appln. KOKAI Publication No. 2011-095388 discloses a projector which improves luminance by freely emitting single-color light and synthetic light.

In this type of projector, a synthetic color is obtained by causing a plurality of light source elements to simultaneously emit light, and an image can be projected with higher luminance. On the other side, there is a demerit of increase in electrical energy consumption per unit time, compared with a case that each of light source elements of a plurality of colors is caused to emit light in a single color only owing to simultaneous light emission from the light source elements of the plurality of colors.

In some cases, a projector is provided with an operation mode of operation at low power. For example, power supply to a light source unit is reduced to be low when the low-electric-power mode is set. When light emitting devices are semiconductor light emitting devices, such as light emitting diodes (LEDs) and semiconductor lasers (LDs), a supplied current is reduced to be low. In such an operation mode, luminance of an image darkens and quality of a projection image may deteriorate due to reduction of the drive power of light emitting devices.

Under the circumstances, it is desired to provide a projection apparatus, a projection method, and a program, capable of minimizing electrical energy consumption and ensuring brightness required for projection.

BRIEF SUMMARY OF THE INVENTION

According to one aspect of the present invention, there is provided a projection apparatus comprising: a light source with light emitting devices of a plurality of colors; a drive unit configured to drive the light emitting devices of the plurality of colors so as to orderly emit single-color light and mixed-color light; an input unit configured to input an image signal; a projection unit configured to form and emit an optical image corresponding to an image signal input by the input unit, using the single-color light and the mixed-color light; and a control unit configured to emit the mixed-color light in a part of a light emission period of the mixed-color light and switch off the light emitting devices during a rest of the part of the light emission period, based on the image signal input by the input unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 shows a concept of setting a change to a drive current in a Ye field, according to the embodiment;

FIG. 6 shows an example of setting each of R, G, Ye, and B field periods, according to the embodiment;

DETAILED DESCRIPTION OF THE INVENTION

Hereinafter, an embodiment for practicing the invention will be described with reference to the drawings. However, the embodiment below will be variously subjected to various limitations which are suitable for practicing the invention while the scope of the invention is not limited to the embodiment below and illustrated examples.

An embodiment will now be described with reference to the drawings where the invention is applied to a Digital-Light-Processing (DLP [registered trademark]) data projector apparatus.

Figure 1:
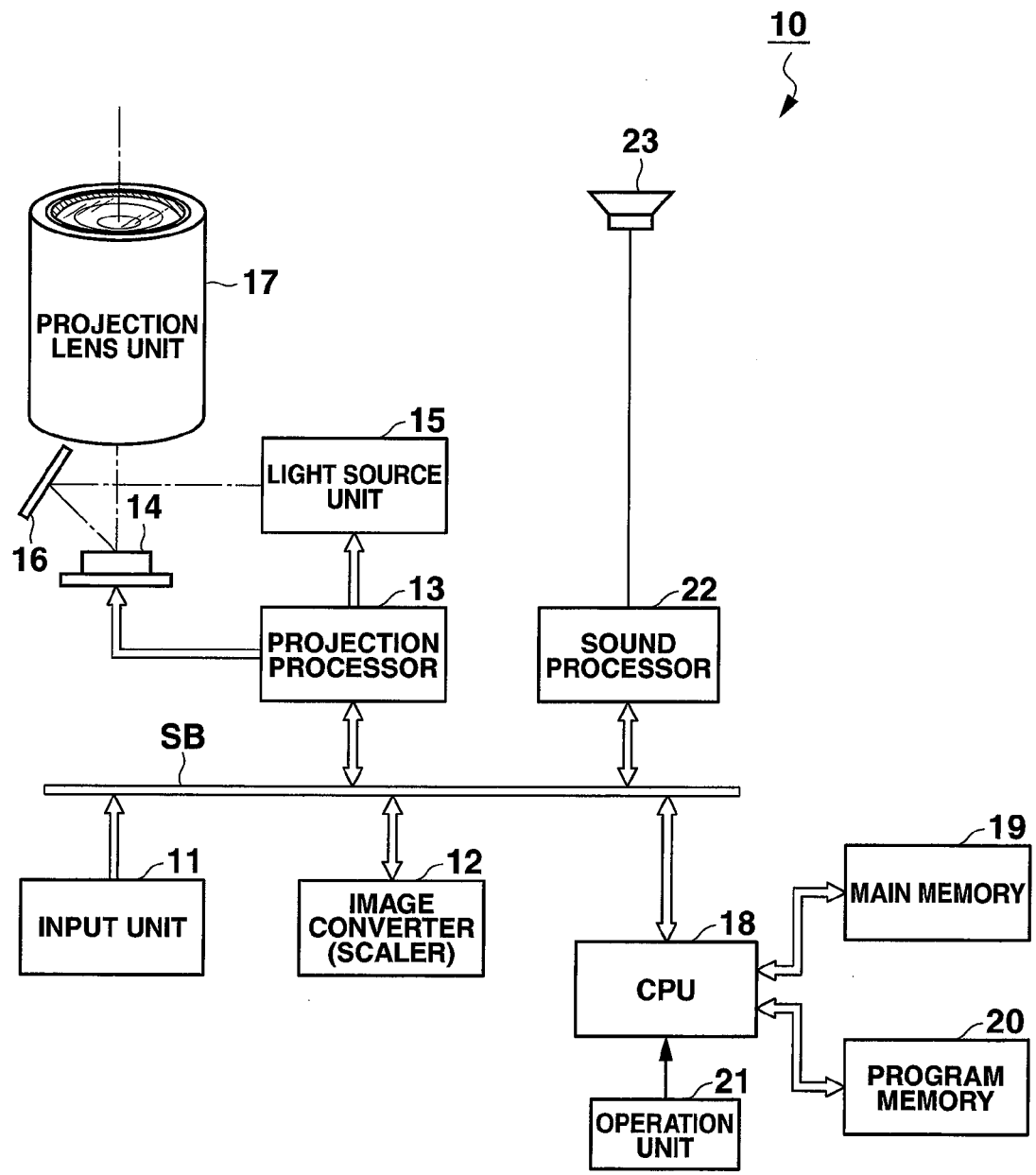
FIG. 1 is a block diagram showing a schematic functional configuration of a data projector apparatus according to the first embodiment of the invention.

FIG. 1 shows a schematic functional configuration of a data projector apparatus 10 according to the embodiment. An input unit 11 is configured by, for example, a video input terminal of pin jack (RCA) type, an RGB input terminal of D-sub15 type, a High-definition Multimedia Interface (HDMI) terminal. Image signals complying with various standards, which are input to the input unit 11, are digitized if needed and are then fed to an image converter 12 through a system bus SB.

The image converter 12 is also referred to as a scaler, and converts input image data into image data of a predetermined format suitable for projection by unifying formats, and feeds the image data to the projection processor 13.

A projection processor 13 drives a micromirror element 14 so as to perform display by higher-speed time-divisional driving in which a frame rate of, for example, 120 frames/second, a number of color components, and a number of display gradations, in compliance with the predetermined format, are multiplied in accordance with the fed image data.

The micromirror element 14 individually turns on/off inclination angles of a plurality of micromirrors arrayed on a Wide eXtended Graphic Array (WXGA: 800 pixels by 1280 pixels) to display an image, and forms an optical image by reflection light thereof.

On the other side, light is emitted in a plurality of colors including primary colors R, G, and B cyclically in a time divisional manner in a manner from the light source unit 15. The light from the light source unit 15 is totally reflected by a mirror 16 and is irradiated onto the micromirror element 14.

An optical image is formed by the reflection light from the micromirror element 14. The formed optical image is projected and displayed through the lens unit 17 onto an unillustrated screen which is a projection target.

The projection processor 13 described above directly controls drive timings of light emitting devices in the light source unit 15, which will be described later.

The CPU 18 controls all operations of circuits as described above. The CPU 18 is directly connected to a main memory 19 and a program memory 20. The main memory 19 is configured by, for example, a SRAM and functions as a work memory for the CPU 18. The program memory 20 is configured by an electrically rewritable nonvolatile memory, and stores an operation program to be executed by the CPU 18 and data in various fixed forms. The CPU 18 performs control operation in the data projector apparatus 10 by using the main memory 19 and the program memory 20.

The CPU 18 performs a variety of projection operations in accordance with key operation signals from an operation unit 21.

The operation unit 21 includes a key operation unit provided on a body of the data projector apparatus 10, and an infrared-light receiving unit which receives infrared light from an unillustrated remote controller specialized for the data projector apparatus 10. The operation unit 21 outputs, directly to the CPU 18, key operation signals based on keys which the user operates by the key operation unit of the body or by a remote controller of the data projector apparatus 10.

The CPU 18 is further connected to a sound processor 22 through the system bus SB. The sound processor 22 includes a sound source circuit, such as a PCM tone generator, and converts audio data supplied during a projection operation, into an analog signal. The sound processor 22 drives a loudspeaker unit 23 to enhances and outputs sounds or generates a beep sound if needed.

Figure 2:
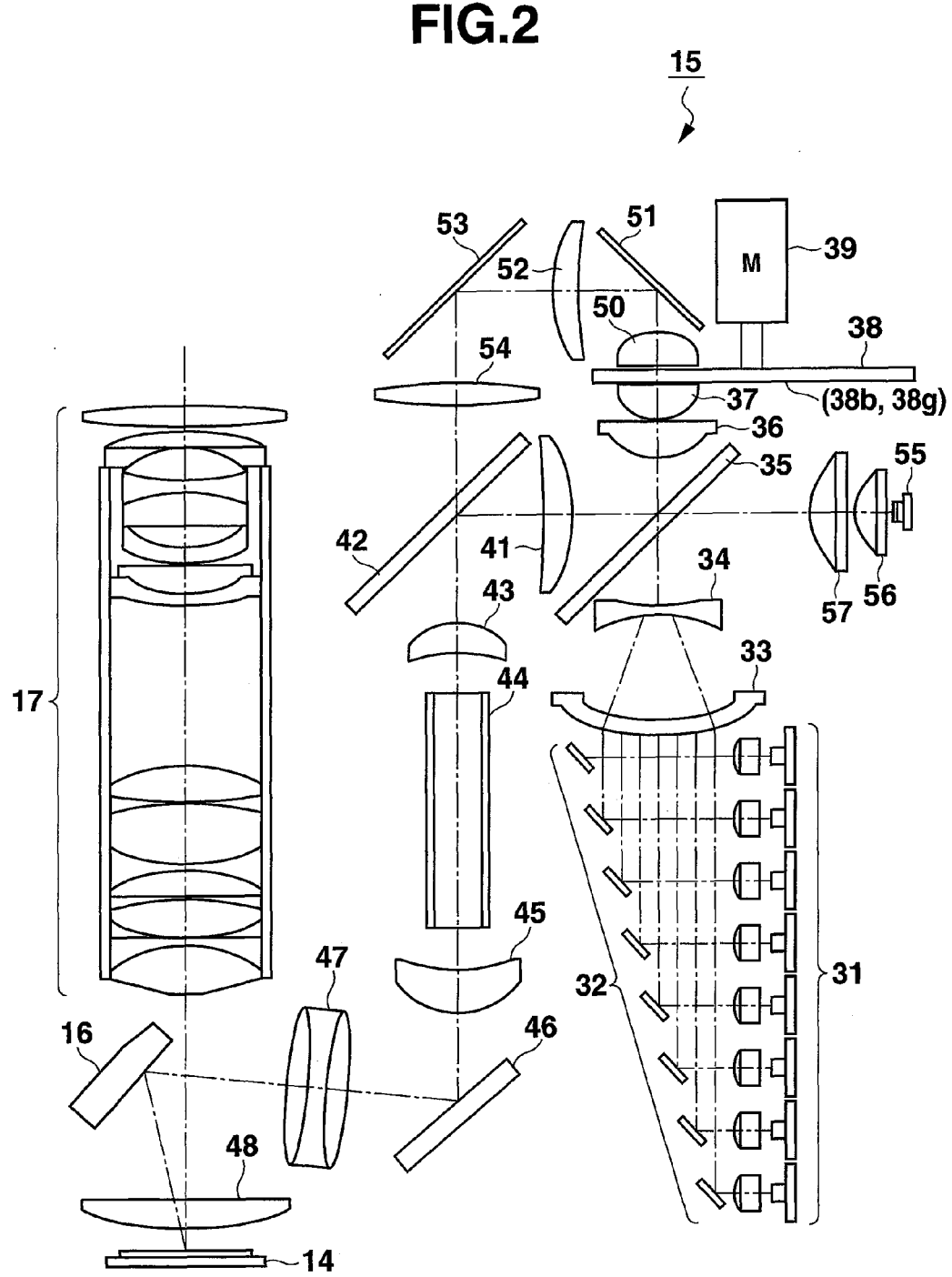
FIG. 2 shows mainly an example configuration of a light source unit, according to the embodiment.

A configuration of an optical system will be described with reference to FIG. 2 where the light source unit 15 described above is configured by using two types of semiconductor light emitting devices.

The light source unit 15 includes a laser diode (LD [semiconductor laser]) array 31 of semiconductor light emitting devices which emit blue laser light, as a light source.

In the LD array 31, for example, total 24 LDs of 8×3 (in directions perpendicular to the figure surface) are arranged on an array. Three columns each including eight of the LDs are connected in series in units of columns, and are driven to emit light. Blue laser light which the LD array 31 emits is reflected at an angle of 90 degrees by a mirror array 32 arranged in steps so as to oppose the LD array 31, and is converged by lenses 33 and 34 into parallel light flux. Thereafter, the light flux penetrates a dichroic mirror 35 and is irradiated onto a peripheral surface of a color wheel 38 as a part of the light source through the lenses 36 and 37.

The color wheel 38 rotates as driven by a motor (M) 39 which is a rotation drive unit. On the peripheral surface, a transmissive diffusion plate 38b and a fluorescent layer 38g are arranged so as to divide a ring-like area. The transmissive diffusion plate 38b and the fluorescent layer 38g are selectively irradiated with laser light from the LD array 31 in accordance with rotation of the color wheel 38.

Rotational synchronization of the color wheel 38 is controlled as the projection processor 13 detects rotation of an unillustrated marker formed in the peripheral surface.

A fluorescent material is applied and forms the fluorescent layer at a position on the peripheral surface where the fluorescent layer of the color wheel 38 exists. In addition, a reflection plate is provided so as to overlap the fluorescent layer, on the back surface of the color wheel 38 where the fluorescent layer 38g is formed.

If the fluorescent layer 38g of the color wheel 38 exists on an optical path of the laser light from the LD array 31, the fluorescent layer 38g is excited by irradiation of blue laser light and emits green light.

The green light emitted from the color wheel 38 is guided uniformly to the side of the lenses 36 and 37 by the reflection plate formed in the back-surface side of the fluorescent layer 38g, and is reflected by the dichroic mirror 35.

The green light reflected by the dichroic mirror 35 is further reflected by a dichroic mirror 42 through a lens 41. Thereafter, the light penetrates an integrator 44 after passing a lens 43, and is thereby formed into light flux with uniform luminance distribution. The green light emitted from the integrator 44 is reflected by a mirror 46 after passing a lens 45, and is thereafter irradiated onto the micromirror element 14 after being reflected by the mirror 16 through a lens 47.

Further, an optical image is formed by reflection light from the micromirror element 14 in a direction to the projection lens unit 17, and the optical image is irradiated onto an unillustrated screen as a projection target through the lens 48 by the projection lens unit 17.

If the transmissive diffusion plate 38b of the color wheel 38 exists on an optical path of laser light from the LD array 31, the blue light diffused and transmitted through the diffusion plate 38b is reflected by a mirror 51 through a lens 50, and is further reflected by a dichroic mirror 53 after passing a lens 52. Thereafter, the blue light is transmitted through the dichroic mirror 42, penetrates the integrator 44 after passing the lens 43, and is thereby formed into light flux with uniform luminance distribution. The blue light emitted from the integrator 44 is further reflected by the mirror 46 after passing the lens 45, and reaches the mirror 16 through the lens 47.

The light source unit 15 includes, as a light source, a light emitting diode (LED) 55 which is a semiconductor light emitting device to emit red light.

The red light emitted by the LED 55 further penetrates the dichroic mirror 42 after passing lenses 56 and 57, and is reflected by the dichroic mirror 42 through the lens 41. Thereafter, the light penetrates an integrator 44 through the lens 43, and is thereby formed into light flux with uniform luminance distribution. The red light emitted from the integrator 44 is further reflected by the mirror 46 after passing the lens 45, and reaches the mirror 16 through the lens 47.

As described above, the dichroic mirror 35 allows blue light and red light to penetrate while the dichroic mirror 35 reflects green light. The dichroic mirror 42 allows blue light to penetrate while the dichroic mirror 42 reflects green light and red light.

Operation of the present embodiment will be described next.

To simplify the following description of operation, one color image frame to project is supposed to be configured by a total of four fields composed of a red (R) field, a green (G) field, a yellow (Ye) field, and a blue (B) field.

Figure 3:
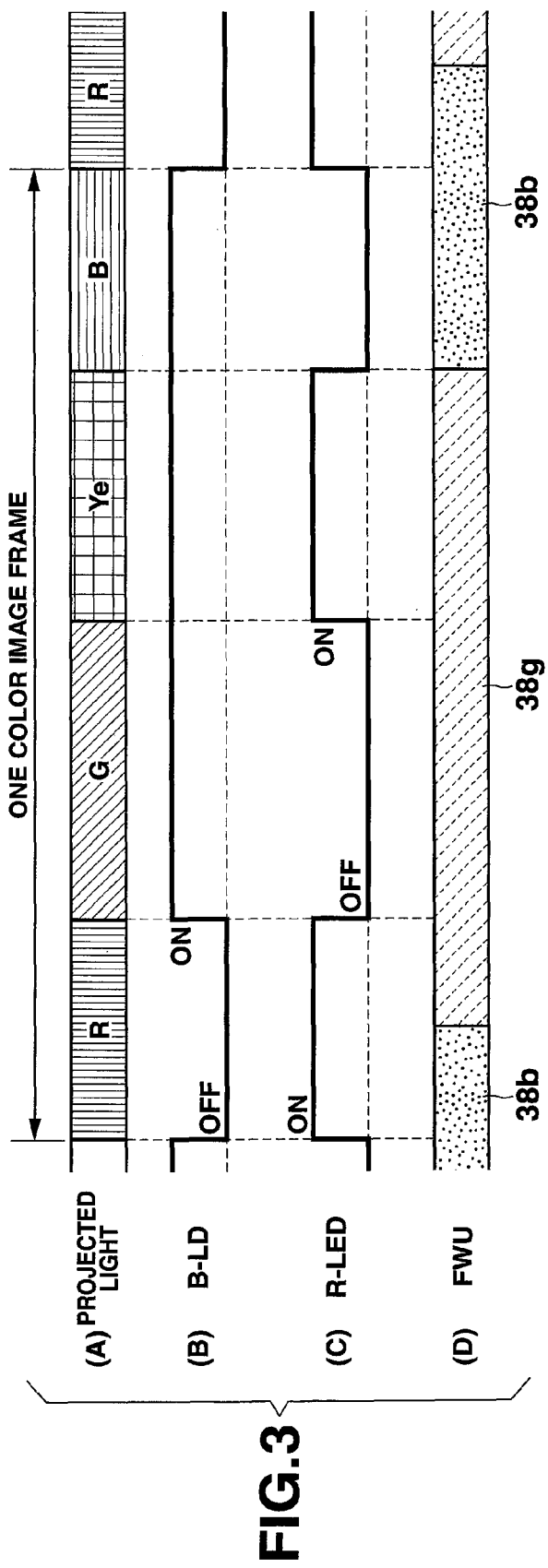
FIG. 3 is a timing chart showing a basic frame configuration and light emitting timings of respective light emitting devices, according to the embodiment.

FIG. 3 is a timing chart showing a frame configuration and light emitting timings of respective light emitting devices in the basic projection operation mode. Images of applicable colors are projected in an order of R, G, Ye, and B as shown in FIG. 3 (A).

Therefore, drive timings of two types of light emitting devices, which are the LD array (B-LD) 31 to emit blue lights including excitation of green light and the LED (R-LED) 55 to emit red light, are as shown in FIGS. 3 (B) and (C). FIG. 3 (D) shows rotation phases of the transmissive diffusion plate 38b and rotation phases of the fluorescent layer 38g at a position of the peripheral surface of the color wheel 38 where the blue light from the LD array 31 is irradiated.

In the illustrated Ye field, yellow light which is a complementary color is obtained by color mixture of the red light emitted by the LED 55 emits, and the green light excited by the fluorescent layer 38g of the color wheel 38 from the blue light which the LD array 31 emits. Accordingly, a bright image can be projected with higher luminance than R, G, and B.

Figure 4:
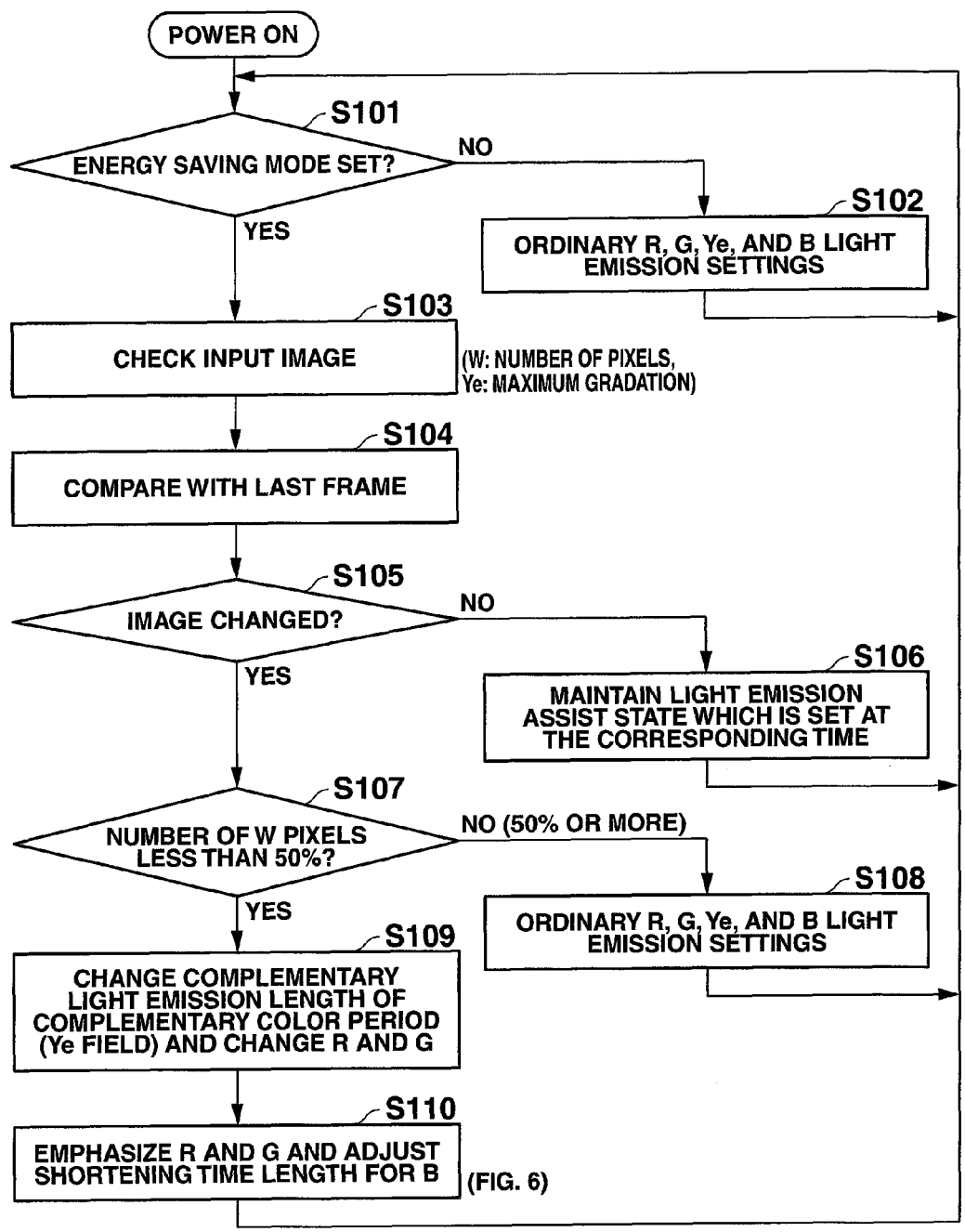
FIG. 4 is a flowchart showing content of a processing procedure of projection operation when the power is on, according to the embodiment.

FIG. 4 is a flowchart showing content of a setting processing particularly for light emission periods of the respective R, G, Ye, and B fields when the power supply is turned on, according to the present embodiment. All the processing shown in these FIG. 4 is executed as the CPU 18 reads the operation program installed in the program memory 20 onto the main memory 19. A projection processor 13 performs control of drive timings of the light emitting devices in the light source unit 15, rotation of the color wheel 38, and gradation control of an image displayed by the micromirror element 14, under control of the CPU 18. As a result, projection operation is performed in accordance with set field periods.

In the figure, the CPU 18 determines whether an energy saving mode has been set at the time point or not (Step S101). If the energy saving mode is determined to have not been set, the CPU 18 sets light emission for each color of R, G, Ye, and B from the light source unit 15 in accordance with a basic projection mode which is set ordinarily, as shown in FIG. 3 (Step S102). Subsequently, the processing returns to the processing from Step S101 again.

Otherwise, if the energy saving mode is determined to have been set in Step S101, the CPU 18 next checks content of an image signal, which has been input from the input unit 11 at this time point and is to be projected next (Step S103).

The check described above is, specifically, to obtain a rate of white (W) pixels among all pixels, and a maximum gradation among all pixels driven in the Ye field.

For example, if a number of gradation bits allocated to each pixel in each of the color fields is eight, gradation values are total 256 steps from zero to a full gradation of 255. In this case, gradations in each of the color fields are R≈G≈Ye≈B≈255 among all pixels. That is, how many pixels project white (W) is calculated as a rate (%). Among all the pixels in the Ye field, a gradation value which has the maximum gradation is calculated together.

Subsequently, the CPU 18 compares one frame of the image signal obtained in Step 103 described above and one frame of an image signal projected just before the image obtained in Step 103, i.e., one frame of the image signal obtained in the past, for each pixel (Step S104). Further, whether or not pixels differ (or change) at a rate of 20% or more of all the pixels is determined, and whether or not a motion appears in a projected image (Step S105). Although the present embodiment exemplifies a case that pixels differ (or change) at the rate of 20% or more of all the pixels, the embodiment is not limited to this case but an optimum value may be set by the user, etc.

If the image is determined to have not greatly changed, the CPU 18 regards content of operation as being not needed to be newly set, and maintains a light-emission drive state in the light source unit 15 which has been set at the time, and maintains a gradation drive state relative to the micromirror element 14 in the projection processor 13. That is, content of each of settings is not performed (Step S106), but the processing returns to the processing from the Step S101 again.

Otherwise, if the pixels are determined to differ at a predetermined rate and if a motion is determined to have appeared in Step S105, the CPU 18 determines whether the number of white (W) pixels checked in immediately previous Step S103 is less than 50% or not is determined (Step S107).

If the rate of white (W) pixels is determined to be 50% or more, the pixels forming half or more of the image are considered to be white, and a document image is considered to be projected for example, for a presentation during projection operation. In this case, if the projection is performed in an energy saving mode, there is a possibility that the whole image is dark and degrades projection quality.

Therefore, the CPU 18 temporarily cancels the energy saving mode thus set, returns to the basic projection mode which is ordinarily set, and emits light in each color of R, G, Ye, and B from the light source unit 15, using effectively a one-frame period of a color image. Further, an optical image is formed by the micromirror element 14 with use of light from the light source unit 15, and is projected through the projection lens unit 17 (Step S108). Thereafter, the processing returns to the processing from Step S101 again.

Otherwise, if the rate of the number of white (W) pixels is determined to be less than 50% in Step S107, the CPU 18 changes and sets the light emission periods of the respective light emitting devices in the Ye field, in accordance with the rate of the number of white (W) pixels which is checked in immediately preceding Step S103, and in accordance with a gradation value of the pixel which is the maximum gradation in the Ye field (Step 109). Hereinafter, a description will be made of setting the light emission period for each light emitting device in the Ye field.

FIG. 5 shows a concept of setting a change to a drive current in the Ye field. FIG. 5 (A) shows respective color field periods during ordinary projection operation, where the periods are not shortened in the energy saving mode. When the projection processor 13 drives the micromirror element 14, the maximum gradation in each of the color fields including the Ye field is supposed to 256, and the gradation value of the pixel having the maximum gradation among all the pixels in the Ye field is 229 (/255) in an image signal.

In that case, for example, up to 128 gradations as the half of the 255 gradations to be expressed in the original Ye field, R and G components forming Ye components are separated, and gradations for the separated components can be compensated for in the R and G fields. Further, the remaining 127 gradations are expressed in a state of low electrical energy consumption in which luminance is reduced to half during the Ye field period. Then, light emission by the LD array 31 and the LED 55 is not required after a timing t11 denoted by a wavy line in the figure, at which time 101 (=229−128)/127 elapses in the Ye field period.

Therefore, as shown in FIG. 5 (B), the CPU 18 can reduce energy consumption by turning off the R-LED 55 which emits light in the state of low electrical energy consumption and the B-LD array 31 for green light excitation during a period from the timing t11 until a timing denoted at T11 when the next B field starts. In this manner, wasteful electrical energy consumption can be reduced while performing required color expression.

Figures 7, 8:
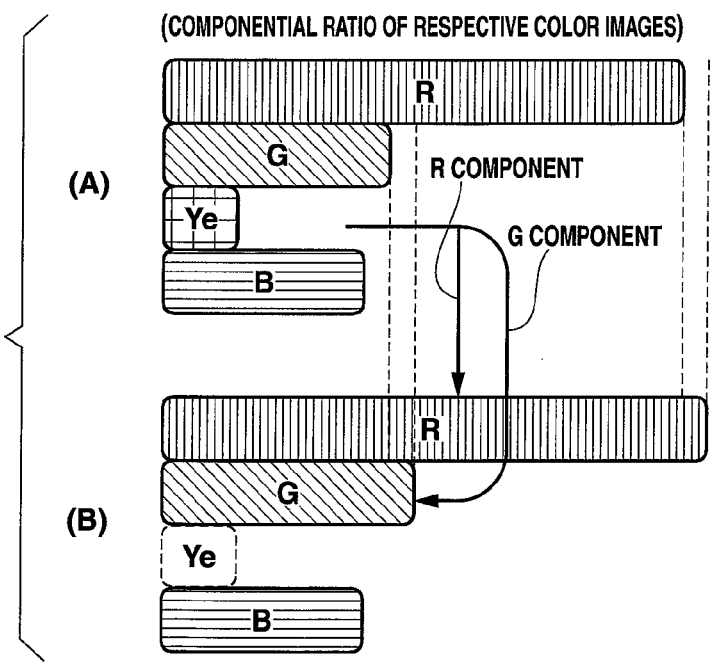
FIG. 7 is an example of a table showing rates of numbers of white (W) pixels, and content of control for a drive power in the Ye field corresponding to a maximum gradation in the Ye field, according to the embodiment.
FIG. 8 show a simplified basic concept of the embodiment.

FIG. 7 is an example of a table, which the CPU 18 reads from the program memory 20 and refers to, showing content of control (a rate of maximum time length which can be reduced) of the drive power in the Ye field, corresponding to the rate of the number of white (W) pixels and the maximum gradation in the Ye field.

As shown in the figure, the rate of the number of white (W) pixels is classified into four ranges: 0%; 0% to less than 25%; 25% to less than 50%; and 50% or more. In addition, the maximum gradation among all the pixels in the Ye field is classified into ranges: 128 gradations or less; 129 to 158 gradations; 159 to 190 gradations; 191 to 254 gradations; and 255 gradations. Further, a rate of the maximum time length which can be shortened when the R-LED 55 and the B-LD array 31 are simultaneously made to emit light in the Ye field.

In FIG. 7, the more the rate of the maximum time length which can be shortened is, the shorter the time during which the R-LED 55 and the B-LD array 31 simultaneously emit light in the Ye field can be. As shown in FIG. 7, the lower the gradation of the Ye field is, the smaller the maximum time length in which the R-LED 55 and the B-LD array 31 emit light in the Ye field is.

Meanwhile, a white image is formed by using all the R, G, B, and Ye fields. Therefore, brightness of the white image darkens as the projection time length of the Ye field shortens. However, an image having a low rate of the number of white (W) pixels originally has low luminance throughout the whole image. Therefore, even if the projection time length of the Ye field is shortened, an observer cannot recognize a change in brightness of a projection image.

Therefore, the lower the rate of the number of white (W) pixels, the longer the maximum time range which can be shortened in the Ye field can be. In the present embodiment, the rate of the number of white (W) pixels is classified into ranges: 0%; 0 to less than 25%; 25% to less than 50%; and 50% or more. However, this classification setting may naturally be changed depending on specs of light sources and use imprisonments.

Also in the present embodiment, the maximum gradation among all the pixels in the Ye field is classified into ranges: 128 gradations or less; 129 to 158 gradations; 159 to 190 gradations; 191 to 254 gradations; and 255 gradations. However, this classification setting may naturally be changed in accordance with specs of light sources and use environments.

In Step S109, the CPU 18 changes and sets the light emission periods of the respective light emitting devices in the Ye field with reference to the table shown in FIG. 7.

In Step S109, if the rate of the number of white (W) pixels is substantially close to 0% and if the maximum gradation value among all the pixels in the Ye field is lower than 128, the CPU 18 is set to be off throughout the whole Ye field. Instead, R and G components forming Ye components of all the pixels are separated in the Ye field. The pixels in the Ye field can be expressed by substitution in the R and G fields.

After the processing in Step S109 described above, the CPU 18 performs emphasis setting of pixel values each subjected to substitution in the R and G fields with the Ye field. Simultaneously, for the time length for which the Ye field is shortened, the period of the B field which makes a relationship of complementary color with the Ye field is set to be shortened if needed (Step S110). The processing as described above is now supposed to have been terminated, and returns to the processing from Step S101 again. The same control as described above is further continued.

The processing in Step S110 is performed to avoid losing a color balance between the R field+G field+Ye field and the B field having a relationship of complementary color, by shortening the Ye field.

FIG. 6 shows an example at the time of setting the fields as described above. FIG. 6 (A) shows an example of light emission timings respectively for the R, G, Ye, and B fields before setting the shortening.

On the other hand, FIG. 6 (B) emphasizes and expresses most of content to be originally expressed in the Ye field by substitution in the R field and G field. Simultaneously, the Ye field is shortened by only the last half period T21, to temporarily turn off the R-LED 55 and the B-LD array 31 for G light excitation. An example of setting to shorten the last half period T22 in the successive B field is shown in compliance with the shortened period.

Thus in the present embodiment, content to be originally expressed in the Ye field is subjected to separation of the Ye component into the R component and R component, and is emphasized and expressed by substitution in the R field and G field. Accordingly, the two types of light emitting devices 55 and 31 are shortened as much as possible in the period of the Ye field, to avoid wasteful energy consumption.

FIG. 8 shows a basic concept of the present embodiment as described above. For example, if an image has color component rates of R, G, Ye, and B as shown in FIG. 8A, content to be expressed in the Ye field is separated into R and G components. Further as shown in FIG. 8B, in the R and G fields, emphasis is respectively performed in accordance with the separated components. In this manner, if display of the Ye field is stopped during the corresponding frame and if simultaneous light emission from the LED 55 and the LD array 31 is stopped, the quality of an image projected from the data projector apparatus 10 does not substantially change.

Therefore, content of an input image is checked, and employment of a color complementary period or a degree of shortening is determined, based on the rate of the number of white (W) pixels to the total number of pixels and based on the maximum gradation to be projected in the Ye field as a color-complementary period. In this manner, wasteful electrical energy consumption can be avoided without degrading brightness of the whole image or image quality.

Figure 9:
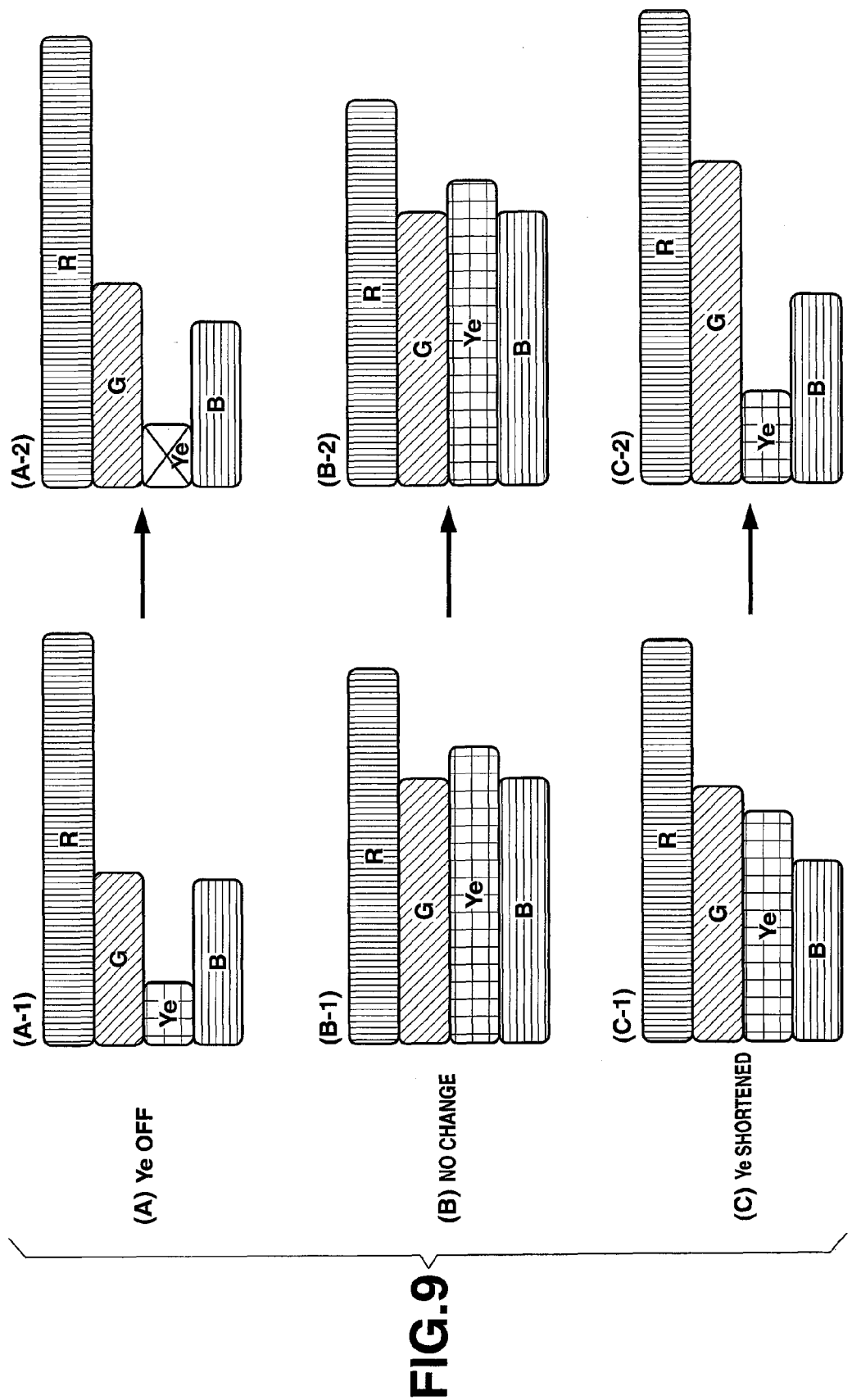
FIG. 9 shows a simplified basic concept of the embodiment.

FIG. 9 shows example settings of the respective field periods.

In FIG. 9 (A), when the rate of Ye components is small, and the maximum gradation of the Ye components is low, Ye components are completely separated into R and G components, and substitutional image projection is performed in R and G fields. As a result, light emission from the R-LED 55 and the B-LD array 31 for green excitation is stopped to turn off light in the Ye field.

FIG. 9 (B) shows a case that, for example, the rate of the number of white (W) pixels among all the pixels forming an image is so high that gradations in R, G, Ye, and B fields are high entirely. Therefore, gradation components in the Ye field cannot be managed to be substituted. As a result, ordinary projection operation is performed even when all ranges of the respective field periods are used in accordance with ordinary light emission settings.

FIG. 9 (C) shows a case that the rate of Ye components is relatively great, and a large part of the Ye components is separated into R and G components, which are substituted in R and G fields respectively to perform image projection with the components emphasized. In this manner, the light emission period in the Ye field is greatly shortened, and accordingly, light emission time of the R-LED 55 and B-LD array 31 for green excitation is extremely shortened in the field.

As specifically described above, according to the present embodiment, brightness required for projection is ensured and deterioration of image quality can be avoided, while electrical energy consumption is reduced as much as possible.

In the above embodiment, light emission in the Ye field formed of a plurality of colors mixed is stopped in accordance with content of an input image signal. Therefore, electrical energy consumption can be greatly reduced by simultaneous light emission.

Further the above embodiment does not dare to shorten or turn off a light emission period for the mixed colors as described, in accordance with the input signal or a projection mode which has been set at the time point. As a result, in a state in which electrical energy consumption need not be reduced, the load can be reduced on the CPU 18 as a circuit of a control system and the projection processor 13 which drives the light source unit 15 under control of the CPU 18.

Further in the above embodiment, as shown in FIG. 6, the period in the B field in which the image to project has a relationship of complementary color with the Ye field is shortened by a corresponding period, in addition to shortening of the period of the Ye field. As a result, when a color balance deems to be lost if projection image components during a color mixing period are separated and expressed, emphasized during a single color period, a period in the single color period which has a relationship of complementary color with the mixed colors is intentionally adjusted, and unnatural loss of color balance is cancelled. By thus changing into expression in achromatic colors, apparent deterioration in image quality can be avoided.

Also in the above embodiment, shortening of the light emission period of the plurality of mixed colors and gradation emphasis of optical images of light emission periods of single colors are performed, in accordance with the rate of the number of white (W) pixels in an input image signal and the maximum gradation value of color pixels corresponding to a plurality of mixed colors.

A determination can be simply made on an image signal input by using a part of processing which generally creates a histogram by employing such a determination method as described above. Therefore, burdens can be reduced on the CPU 18 as a circuit of a control system and on the projection processor 13 which drives the light source unit 15 under control of the CPU 18.

In the embodiment as described above, the light source unit 15 generates yellow light as mixed colors of green light and red light, and one color image frame is configured by color fields of R, G, Ye, and B including the mixed colors. However, the invention is not limited to the embodiment but may be configured to set, for example, a field corresponding to magenta light as mixed colors between red light R and blue light B, a field corresponding to cyan light as mixed colors between green light G and blue light B, or a field corresponding to white light W as mixed colors between red light R and green light G.

Also in the embodiment as described above, components of mixed colors which can be substituted with other single-color field are separated. Expression in corresponding single-color fields are emphasized by equivalent amounts, and light emission periods of remaining mixed color components which cannot be substituted are shortened. Projection operation is then performed. However, at this time, not only the light emission periods are shortened but also a method may be employed together. In the method, electrical energy consumption may be reduced by controlling a drive current since electrical energy consumption at the time of simultaneous light emission is controlled by a current in many semiconductor light emitting devices.

In the above embodiment, the rate of the maximum time length of the Ye field which can be shortened is defined as shown in FIG. 7. However, this rate may be changed based on a duty ratio of the Ye field. For example, a case is considered as a mode change measure in which the duty ratio of the Ye field is set to 80 degrees (within 1 frame=360 degrees) in an ordinary projection mode, and the Ye field is set to 120 degrees in a high-luminance projection mode.

In the high-luminance projection mode, the duty ratio of the Ye field is greater than in the ordinary projection mode. That is, since projection time of Ye is long, influence of reduction in brightness of a white image, which is caused by shortening the Ye field, is great in the high-luminance projection mode. Therefore, in the high-luminance projection mode, the rate of the maximum time length of the Ye field may be controlled to be shorter than that in the ordinary projection mode. That is, control is performed in a manner that, the greater the duty ratio of the Ye field is, the smaller the rate of the maximum time length of the Ye field which can be shortened is. In this manner, even in a projection apparatus which controls duty ratios of various color fields to change, brightness required for projection can be ensured and deterioration of image quality can be avoided, while electrical energy consumption is reduced as much as possible.

Further, the invention is not limited to the embodiment described above but can be variously modified in practical phases without deviating from the subject manners of the invention. In addition, functions performed by the embodiment described above may be combined as suitably as possible, and may be performed. The embodiment described above further includes various stages, and various inventions can be derived by appropriate combination of a plurality of disclosed components. For example, even if several components are removed from all the components disclosed in the embodiment, the configuration from which the several components are removed may be extracted as an invention, insofar as effects of the invention are obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A projection apparatus comprising:
   a light source with light emitting devices of a plurality of colors;
   a drive unit configured to drive the light emitting devices of the plurality of colors so as to orderly emit single-color light and mixed-color light;
   an input unit configured to input an image signal;
   a projection unit configured to form and emit an optical image corresponding to an image signal input by the input unit, using the single-color light and the mixed-color light; and
   a control unit configured to emit the mixed-color light in a part of a light emission period of the mixed-color light and switch off the light emitting devices during a rest of the part of the light emission period, based on the image signal input by the input unit.

2. The projection apparatus of claim 1, wherein the control unit is configured to emphasize gradations of an optical image of the mixed-color light of the rest of the part of the light emission period during the light emission period of the single-color light, based on a length of the shortened light emission period of the mixed-color light.

3. The projection apparatus of claim 1, wherein the control unit is configured to determine a length of the part of the light emission period, in accordance with a rate of white pixels in the image signal input by the input unit.

4. The projection apparatus of claim 1, wherein the control unit is configured to determine a length of the part of the light emission period, in accordance with a maximum gradation value among color pixels corresponding to the mixed-color light in the image signal input by the input unit.

5. The projection apparatus of claim 1, wherein the control unit is configured to determine a length of the part of the light emission period, based on a duty ratio of the light emission period of the mixed-color light.

6. The projection apparatus of claim 1, wherein the control unit is configured to shorten a light emission period of the single-color light having a relationship of complementary color with the mixed-color light, based on a length of the rest of the part of the light emission period of the mixed-color light.

7. The projection apparatus of claim 1, wherein the control unit is configured to update a length of the part of the light emission period of the mixed-color light in response to an input of the image signal.

8. A projection method applied to an apparatus including a light source with light emitting devices of a plurality of colors, a drive unit configured to drive the light emitting devices of the plurality of colors so as to emit sequentially emit single-color light and mixed-color light, an input unit configured to input an image signal, and a projection unit configured to form and emit an optical image corresponding to an image signal input by the input unit, using the single-color light and the mixed-color light, the projection method comprising:

emitting the mixed-color light in a part of a light emission period of the mixed-color light and switching off the light emitting devices during a rest of the part of the light emission period, based on the image signal input by the input unit.

9. A non-transitory computer-readable storage medium having a program stored thereon which controls a computer of an apparatus including a light source with light emitting devices of a plurality of colors, a drive unit configured to drive the light emitting devices of the plurality of colors so as to emit sequentially emit single-color light and mixed-color light, an input unit configured to input an image signal, and a projection unit configured to form and emit an optical image corresponding to an image signal input by the input unit, using the single-color light and the mixed-color light, to perform functions comprising:

emitting the mixed-color light in a part of a light emission period of the mixed-color light and switching off the light emitting devices during a rest of the part of the light emission period, based on the image signal input by the input unit.

* * * * *